R. A. ENGLER.
FLYING MACHINE.
APPLICATION FILED OCT. 11, 1915. RENEWED SEPT. 27, 1920.

1,394,816.

Patented Oct. 25, 1921.
8 SHEETS—SHEET 1.

WITNESSES:
Amelia Engler.
Dora Rhomberg.

INVENTOR
Richard A. Engler.

R. A. ENGLER.
FLYING MACHINE.
APPLICATION FILED OCT. 11, 1915. RENEWED SEPT. 27, 1920.

1,394,816.  Patented Oct. 25, 1921.
8 SHEETS—SHEET 5.

WITNESSES:  INVENTOR

R. A. ENGLER.
FLYING MACHINE.
APPLICATION FILED OCT. 11, 1915. RENEWED SEPT. 27, 1920.

1,394,816.

Patented Oct. 25, 1921.
8 SHEETS—SHEET 8.

WITNESSES:
Amelia Engler.
Dora Rhomberg.

INVENTOR
Richard A. Engler.

UNITED STATES PATENT OFFICE.

RICHARD A. ENGLER, OF EVANSTON, ILLINOIS.

FLYING-MACHINE.

1,394,816.      Specification of Letters Patent.      Patented Oct. 25, 1921.

Application filed October 11, 1915, Serial No. 55,355. Renewed September 27, 1920. Serial No. 413,249.

*To all whom it may concern:*

Be it known that I, RICHARD A. ENGLER, a citizen of the United States, residing in Evanston, in the county of Cook and State of Illinois, have invented a new and useful Flying-Machine, of which the following is a specification.

Believing that the aeroplane is not the real solution of mechanical flight, for reasons to follow, I have designed a type of flier known both as an "orthopter" and "ornithopter" or "wing flapper", belonging, like the aeroplane, to the heavier than air machines.

My invention makes use of active or moving planes or surfaces which elevate, sustain and propel, as distinguished from the aeroplane in which the planes are passive, that is, inert dead surfaces which are wedged forward and upward by, for mechanical reasons, a diminutive high speed propeller, which is auxiliary, having no supportive qualities in itself, being obstructive when not in motion, impotent against a fairly strong wind and makes with the planes a swimming operation of flight. The aeroplane must be driven at a certain speed or fall. The aeroplane cannot fly with the wind unless it greatly exceeds the speed of the wind; cannot fly across the wind on account of its large dead surfaces; and its stability also depends on its velocity. In aeroplanes the great sustaining surfaces therefor, form at once their weakness and strength. They sustain and lift but are very difficult to wedge forward and if a wind be blowing they become unmanageable.

However, my machines may be provided in some constructions with both passive and active surfaces, that is, planes that are passive, because the body of all types must of course be considered as passive surfaces. The passive planes, moreover, may be expanded or contracted and operate horizontally but not vertically and vice versa.

My object is to provide a machine that will attack and subdue the air in a certain manner, instead of giving the air an opportunity to subdue it. To explain, in flight a certain supportive space must be covered either by comparatively small wings made to vibrate rapidly to get the required area of support or by large wings spread out as solids. In the first case the wind has no purchase, whereas in the latter, which approximates it to a balloon the wind can master it. In nature various sized wings are driven at various speeds to get the desired supportive area.

That no fixed relation exists between the area of the wings and the size and weight of the body is evident on comparing the dimensions of the wings and bodies of the various orders of insects, birds and bats.

If such comparison be made it will be found that the pinions in some instances diminish while the bodies increase and conversely. No practical good can therefore accrue to aerostation from elaborate measurements of wings and body of any flying thing, neither can any rule be laid down as to the extent of surface required for sustaining a given weight in air. The statements here advanced are borne out by the fact that wings of insects, bats, and birds may be materially reduced without impairing their powers of flight. In such cases the speed with which the wings are driven is increased in direct ratio to the mutilation. In nature small wings driven at high speed produce the same result as large wings driven at low speed. Those apparent inconsistencies in the dimensions of the body and wings are readily explained by the greater muscular development of the heavy-bodied, small winged insects, birds and bats and the increased power and rapidity with which the wings in them are made to oscillate. This is of the utmost importance in the science of aerostation, as showing that flight may be attained by a heavy powerful animal with comparatively small wings, as well as by a lighter one with greatly enlarged wings. While, therefore, there is apparently no correspondence between the area of the wing and the animal to be raised, there is unless in the case of sailing insects, birds and bats, an unvarying relation as to the weight and number of oscillations. Soaring birds must all flap their wings in starting to fly. Thus from what has been said so far it can be seen that the problem of flight resolves itself into one of weight, power, velocity, and small active surfaces *versus* buoyancy, debility diminished speed and extensive active surfaces, with a wide range in between these two extremes and weight a *sine qua non*.

The fact that birds, bats and insects can have their wings clipped and still fly proves that their wings are in excess for carrying their bodies. They carry their bodies with ease when the wings are normal which is proven by the fact that they can carry weights often nearly equal to their own weight. All this pointing out the folly of measuring wings for a certain weight to be elevated and showing that flight is possible within a wide range. However there is a general law promulgated by De Lucy and others, to the effect that the larger the volant animal the smaller by comparison are its flying surfaces, which law is substantiated by tables of comparisons. The existence of such a law is very encouraging so far as artificial flight with wing flapping mechanism is concerned, for it shows that the flying surfaces of a large heavy powerful flying machine will be comparatively small and consequently compact and strong. This is a point of very considerable importance as the object desiderated in flying machines is elevating capacity.

I wish to have my machine wings strike the air intelligently and as a master, to elicit both an upward and upward and forward recoil. As in the bird, bat and insect so in the artificial flying machine; art must follow nature as to the fundamental laws and application of same underlying flight, but not necessarily as to construction.

The manner in which the wings of birds, bats and insects traverse the air, so as practically to increase the basis of support raises the whole subject of artificial flight.

In insects of the beetle family both active and passive surfaces or planes (not considering the body) are provided.

All wings act upon a common principle, that of a screw; and present kite like surfaces to the air through which they pass; and strike downward and forward on the down stroke; and upward and forward on the up stroke; and lastly and very important is the fundamental fact that the screw action of the wings causes the same to describe a figure of 8 track in space when the creatures are fixed or playing their bodies before an object; and that the figure of 8 tracks are opened out into wave tracks in rapid progressive flight. When the wing describes only a half figure of 8 in space then the wing motion known in the art as "trochoidal" is obtained.

The figure of 8 curves are fundamental not only in flight but also in walking and swimming creatures. In sculling with an oar we also have a figure of 8 motion and an imitation of fishes fins and tail The figure of 8 is fundamental because the motion of the wings may be a figure of 8; the wings themselves when at rest or in motion may have a twist giving them a figure of 8 appearance, the wing in part, for instance the tip, may describe a figure of 8 in space; and the undulating wave tracks in space in progressive flight have the figure of 8 appearance when taking account of the alternate rise and fall of the wings and the body, the two waves crossing each other and thus causing waves having a figure of 8 appearance.

The figure 8 action of the wing explains how an insect, bird or bat may fix itself in the air, the backward and forward reciprocation of the wings affording support but no propulsion, the backward and forward strokes counterbalancing each other.

In true aerial flight gravity and weight are of great importance because the flying creature exchanges nearly all his effort for gravitational force, through the action of the air on the inclined planes formed by the wing in the plane of progression, before the operative cycle of flight is performed; and the inertia of the mass of the creature enables it to control and direct its movements in air; the power required by the flying creature being the most economic extant.

The down and up strokes are compound movements, the termination of the down stroke embracing the beginning of the up stroke; and the termination of the up stroke including the beginning of the down stroke. This is necessary in order that the down and up strokes may glide into each other in such a manner as to prevent jerking and unnecessary retardation.

Not the least curious feature of the wing movements is the remarkable power which the wing possesses of making and utilizing its own air currents. Thus, when the wing descends it draws after it a strong current which being met by the wing on the ascent greatly increases the efficacy of the up stroke. Similarly and conversely when the wing ascends it creates an upward current which being met by the wing when it descends, powerfully contributes to the efficiency of the down stroke. Neither the down or up strokes are complete in themselves.

The wing to act efficiently must be driven at a certain speed and in such a manner that the down and up strokes glide into each other, only in this way can the air be made to pulsate and the rhythm of the wing and the air waves can be made to correspond. The air must be seized and let go in a certain order and at a certain speed to extract a maximum recoil, the rapidity of the wing movement being regulated by its size. While the body offers comparatively little resistance to the air, the wings when properly driven compress the air sufficiently to produce a suitable fulcrum to secure the onward impetus. Since bodies in air experience a minimum resistance and occasion a maximum of displacement it is difficult to compress the air suitable to secure a fulcrum.

I have given the principles above of natural flight because there is no escapement from the natural laws; and since I have incorporated accurately the above laws it will be helpful to an understanding of my machines.

In the natural flying machine we find the power applied to the wing by the inefficient third order of lever, whereas in the artificial machines herein disclosed will be found the efficient first class or order of lever applied to the wings, with the choice of using the third order lever in some cases; and in all instances the power is applied by rotation instead of reciprocation, another important departure from nature.

I have designed my machines for gaining simplicity and lightness, with requirements of power that can be compared favorably with that used in nature. Further, for safety in starting; ascending vertically or at any desired angle; balancing itself automatically by the gyroscopic action of its moving wings; hovering; descending as in soaring flight or by the air causing the movable planes to operate in the reciprocal of ascending or a combination of both; landing safely; any desired horizontal or vertical speed; and small head resistance.

My apparatus, in principle, is further applicable to other gases and with fluids and so that these various media are attacked by the active surfaces or that the gas or fluid in motion will cause a reciprocal action of the movable surfaces, as for instance, in air and water it may cause propulsion by power applied or power may be extracted from the air or water when the apparatus is used as a wind mill or water wheel.

Having now among other things enumerated the main laws, principles and facts of natural flight I will show by reference to the figures and their description how my machines follow the natural laws, principles and facts.

My invention is fully described in the following specification, of which the accompanying drawings form a part, in which the separate parts are designated by the same reference characters in each of the views, and in which:

Fig. 19 a fourth; Figs. 30, 31 and 32 are various modifications of the rotational mechanism and their travelers.

Figure 1:
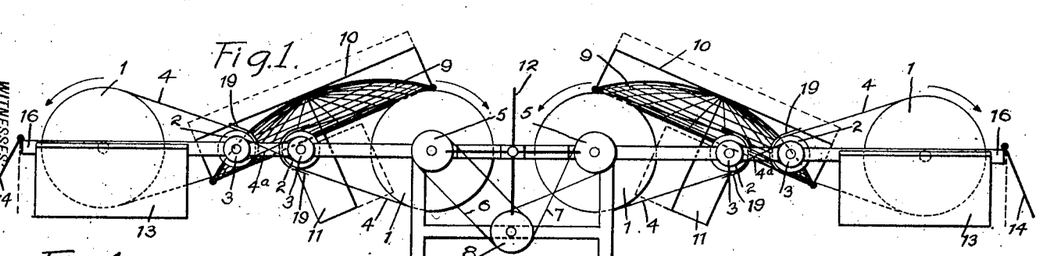
Figure 1 is a rear elevation, Fig. 2 a plan view and Fig. 3 an end or side elevation of one form of my machine.
Figures 2, 30, 31:
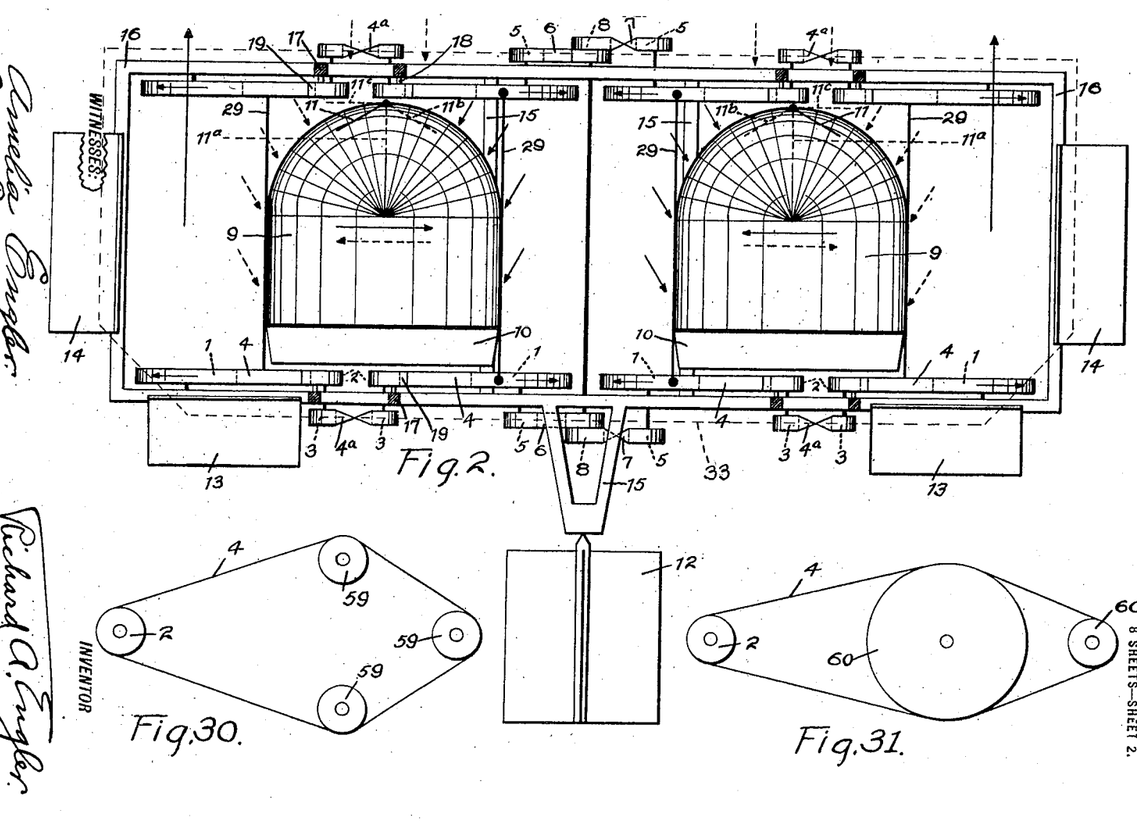
Figures 3, 19:
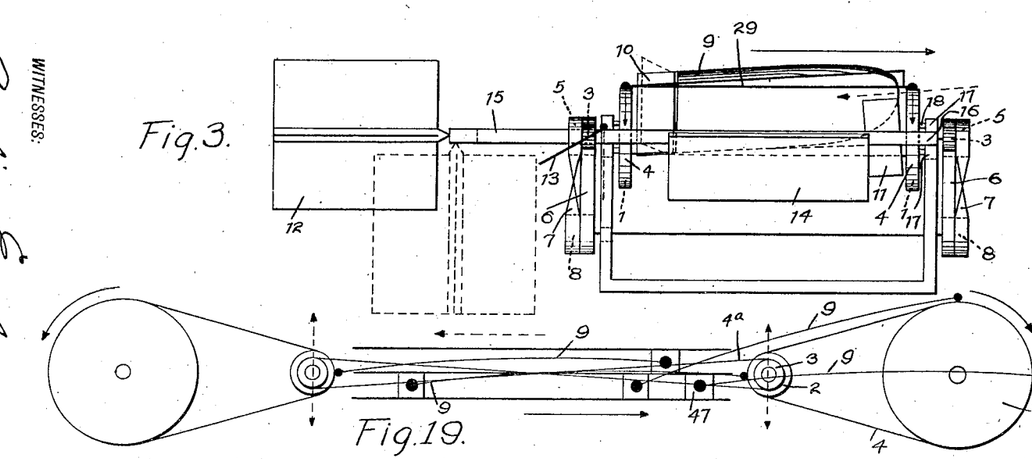

Referring to Figs. 1 to 3 there are illustrated four large wheels 1, preferably light sprocket wheels; four small wheels 2 also light sprocket wheels; and four other small ones 3, which can be identical with the former, and are on the same shaft. The large wheels 1 and small wheels 2 are coupled in pairs by the chains or belts 4 and each of these coupled pairs coupled together by the crossed belts or chains $4^a$, which latter travel on the wheels 3. Each of the large wheels 1 on the inner side of the machine is provided with drive wheels 5, each of which drive wheels is driven, one with a straight belt or chain 6 the other with a crossed belt or chain 7, by the main drive wheel 8, which is in turn driven by any suitable source of power.

The small wheel can be replaced by a mere rotating collar on the shaft or the traveler may slide on the shaft itself, thus reducing the size still more. In this case each half figure 3 must be connected by drive chain to the motive power.

Figure 20:
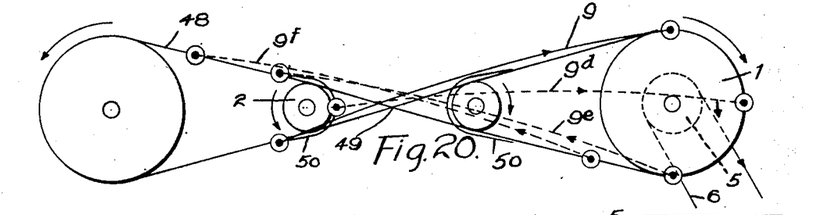
Figs. 20, 21, 22, 23, 24 and 25 diagrams and mechanisms representing a fifth type, all five types employing figure of 8 or part of figure of 8 wing movements and mechanism to cause hesitation at one of the ends of the wings.
Figure 21:
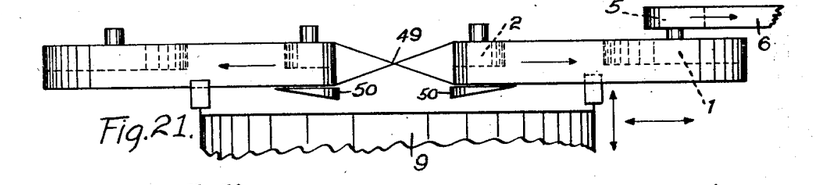

The various coupled systems are driven so as to rotate in the direction of the arrows adjacent to the large wheels 1. Each set of coupled wheels on each half of the machine takes the form of a figure of 8; and each of these figures of 8 mechanisms has attached to it a flying organ 9. One end of each flying organ is attached to the chain or traveler 4 forming with its two wheels a half figure of 8. It will be understood that there is another system of wheels, such as described so far, in the front end of the machine, because the flying organ 9 has four ends to be supported. On the rear of each of the flying organs, is attached, preferably above them, a horizontal propeller 10, which operates on the down strokes; on the front of the flying organs are vertical propellers 11 which operate on the up strokes. The horizontal propellers bend upward more on their advancing or forward ends than on their rear ends during the down stroke when they are made of flexible material, while if made of stiff material they bend upward equally throughout their whole length. A horizontal and vertical rudder is illustrated at 12. The vertical propeller 11 can act as a stationary rudder in vertical ascent. Horizontal stabilizing planes 13 and vertical stabilizing planes 14 are provided, which however, are not absolutely necessary because the gyroscopic action of the moving flying organs 9, and propellers 10 and 11 tends to stabilize both horizontally and vertically. In turning of the machine one of the wings may be made to move slower than its mate, which of course affects the propellers also, and swings the machine around, the slow wing being the pivot. In again advancing in straight flight the wings must again act in exact synchronism to balance the machine perfectly. These planes 13 and 14 may suffice for aeroplane surfaces when the flying organs are too small for soaring. The planes 13 with the rudder 12 are manipulated in the same manner as in the present aeroplane for horizontal stability, while planes 14 with the rudder 12, when changed from a horizontal to vertical position as shown by the dotted lines in Fig. 3, are manipulated in the same fashion to secure stability when the machine ascends vertically. Planes 14 can turn upward normally instead of hanging downward as shown. The vertical planes 14 may point in the reverse direction. They may be placed stationary and exactly vertical either up or down, they then act as steadying fins. One pair of planes either 13 or 14 may suffice for gaining both horizontal and vertical stability. A body 15 with two extremities 16 supports the whole structure as described. Fig. 1 can have a passive movable plane 33 like that in Fig. 13. Figs. 19, 20 and 21 movements can be employed to operate the wings of Fig. 1.

The flying organs partake of a reciprocating motion toward each other and the center of the machine and away from each other toward the ends of the extremities 16 of the machine describing in their transit a figure of 8 in space, just like a bird, bat or insect when the body of the creature is fixed; and like an oar in sculling.

Figures 4, 5, 11:
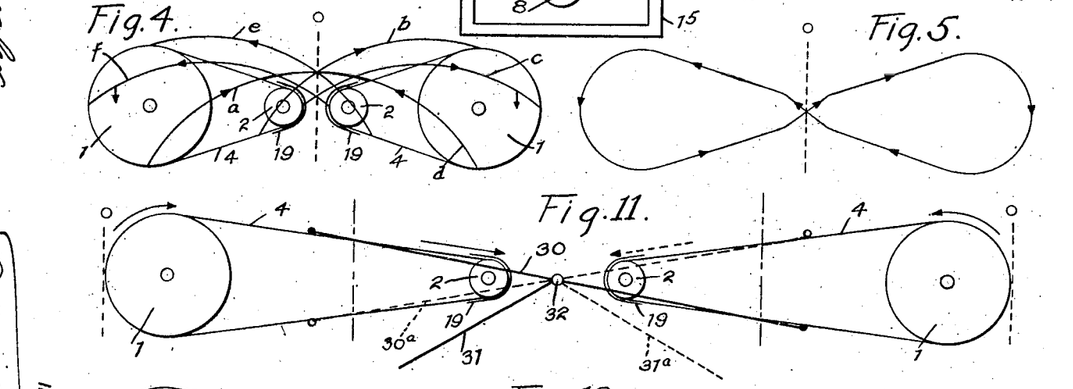
Figs. 4 and 5 are diagrams explanatory of the figure of 8 movement of the wings, of Figs. 1, 2, 3, in space.
Figs. 11, 12, 13 and 14 explain by diagram and mechanism another form of machine.

Fig. 4 illustrates the various positions and directions of one flying organ in its travels to and fro and in a figure of 8 fashion. The up stroke is indicated by letters a—b—c. At b the up and down strokes glide into each other; b—c—d indicates the down stroke. At c the second up stroke in the opposite direction commences while the first down stroke terminates at d; d—e—f is the second up stroke while e—f—a is the second down stroke. The position of the wings 9 in Fig. 1 corresponds to the position b in Fig. 4.

Fig. 5 is a diagram of the figure of 8 described in space by the flying organ. At o the posterior end of one up stroke becomes the anterior end of another and next up stroke. It is at this zero point also that the end being posterior and anterior at the beginning and end of each up stroke, must for an instant hesitate in its motion. This hesitation will be explained under Fig. 6. Instead of having the wing hesitate in the rear it can do this on its front end.

Returning to Fig. 2 the full line straight arrows on the flying organ 9 indicate their direction of motion on the up stroke, toward each other and the center of the flying machine. The full arrows around the advancing edges of the flying organ indicate the resultant of the air current when the machine is also advancing horizontally as indicated by the long full line arrow. On this up stroke the vertical propeller 11 is in the position as shown by the full heavy lines, while the horizontal propeller 10, which is equivalent to the secondary and propelling feathers of a bird's wing, is in an inert position, as shown by the full lines, particularly in Fig. 3; the former propel while the latter are inert. When the down stroke begins the vertical propeller 11 is in the position of the dotted lines 11$^a$ and is inert while the horizontal propeller 10 is active and in the position as indicated by the dotted lines in Fig. 1 and Fig. 3.

The machine cannot over balance forward through the operation of the horizontal propeller because the machine moves forward. In vertical flight the propeller is held inoperative. The horizontal propellers might be eliminated.

When the organs 9 get to the end of the up stroke, the air currents strike them as indicated by the dotted line arrows pointing in exactly the opposite direction to the long full line arrow or direction of forward motion of the whole machine.

When the second up stroke toward the ends 16 of the machine begins the vertical propeller 11 takes the position of action gradually till it is as indicated by dotted line 11$^b$. At the same time of the beginning of the up stroke the horizontal propeller 10 gradually begins its inert period. During this up stroke the resultant air currents are indicated by the dotted arrows around the advancing edge of the flying organ when advancing in the direction of the dotted horizontal line arrow. It will thus be seen that during each up stroke the air currents cross diagonally across the wing 9, and straight across its length on the down strokes, with a gradual passing from one condition to the other periodically. When the wings go away from the center of the machine, when the machine is advancing horizontally, then diagonal air currents cross the wing in one direction, when the wings go toward the center, then the air currents cross the wing diagonally in the opposite direction, therefore when the wing is on the down stroke it is practically at rest with respect to the to and fro motion of the wings, therefore it follows that since this is the zero point between two opposite motions, this zero line between them must be a straight one, hence the air currents going straight along the length of the wing. Furthermore the down stroke tends to force the air straight down at right angles to the wings, and since the machine is advancing horizontally, the down stroke does not alter the direction of the air currents, which are at this instant parallel with the length of the wings but merely compresses them downward. When the machine is not moving horizontally the air currents caused by the motion of the wings to and fro strike the wings across their width. Each up and down stroke brings into play its particular propeller. When the machine is going vertically upward, the two propellers 10 and 11 are held inert, that is, 10 is held on its rear edge so that it cannot bend upward while 11 is held over in the position shown by dotted lines 11°. In straight flight the propellers 11 have the same angles but in turning of the machine the two propellers take up different angles with respect to each other.

It will be noted that with the rounded forward edge of the wing 9 a large lifting area is presented by the flying organ, without the flying organ at the same time being excessively large itself. This is due to the resultant air currents caused by the forward motion of the machine as a whole and the to and fro motion of the wings 9. This rounded nose of the wings also provides a good attacking front for the wings against the wind. The wings need not be parabolic in the front but should probably be so on both sides.

The to and fro motion of the wings gives the same supporting area as would a solid plane of an area equal to the space traversed by the wings. In a bird, bat and insect the space traversed by the wings forms a circular supporting surface while in the preferred forms of my machine a rectangular shaped support is created, which latter has the advantage of having a greater area than the former. My machine wings travel in straight lines to and fro while a bird's, bat's and insect's travel around a center and to and fro. The various directions of the air currents under the wings and the periodic change of these currents: the constant change of angle of the wings because of the up and down movements; the to and fro movements of the wings which causes them to be in one given position no more than an instant; all the above facts tend to stabilize in winds, in air pockets, and in general.

Also in most of my machines the sustaining and elevating surfaces are one and the same, while in bird, bat and insect, the tip elevates and the wing portion next the body sustains.

The wings 9 are concave on the under side and convex on the upper, thus the lower surface has a good biting surface and grasps the air with avidity on the down stroke, while the convex upper surface evades the superimposed air; and over the advancing upper edge of the wing a vacuum is created which aids the lifting power.

The wings and propellers reverse and reciprocate, thus creating the air currents upon which they are destined to ride, thereby increasing their elevating, sustaining and advancing powers. The horizontal propellers can be used as ailerons to get wing warping effects.

The flying organs 9 are also given an upward angle on the forward or advancing end, meaning here the horizontal advance end or front of the machine as a whole. The dotted arrow Fig. 3 shows the angle of incidence of the forward or advancing edge of the wings. The angle of incidence can be varied while in flight by suitably constructing the machine. The bird can likewise change the obliquity of the kite like surface of its wings in the plane of progression, which is of advantage both in natural and artificial flight.

Figure 13:
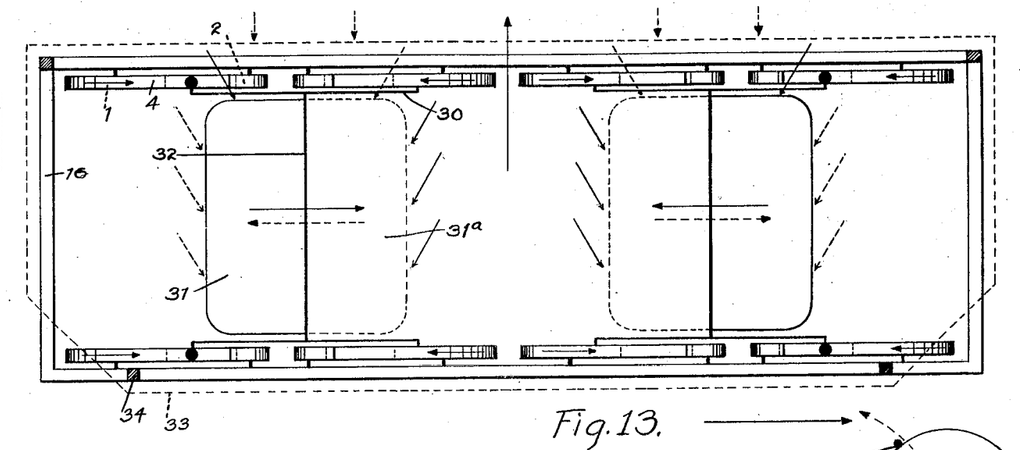

In making a turn with my machine, one wing can be tilted up while the other is turned downward, both on the forward ends which changes the angle of incidence at which they strike the air which gives the same results as the wing warping in aeroplanes and the wing tilting in birds. Thus planes 13 become superfluous.

Since my machine can sustain itself stationary in the air it follows that when it is made to advance horizontally and it is desired to make a turn while moving horizontally, no stabilizing devices for turning are needed, because it cannot fall being capable of holding itself in one particular spot, therefore it automatically leans in the right direction in a manner similar to that required of land vehicles in making a turn.

A figure of 8 mechanism carrying wings can be used to propel the machine horizontally as well as to lift it vertically. An ordinary propeller will also do to propel horizontally. The vertical propellers 11 can be put above the wings instead of below as now shown; and when in either of these positions may be placed on the rear as well as on the front of the sustaining wings or may be placed both in front and rear. Horizontal propellers can be placed in front as well as in rear or in both places, and can work in opposition in vertical flight and aid each other in horizontal flight. The vertical propellers can likewise work in opposition and aid each other when they are provided in the front and rear. To have these propellers in front and rear tends to balance their weight and thrust. This vertical propeller in conjunction with the main sustaining horizontal wings really constitute a "Hargrave box kite" and stability is gained therefore in my machine in the same manner as in this well known kite.

The vertical propellers 11, one or the other, depending on which way one wants to turn, can be held in a position so that it offers more resistance to forward motion than its mate, thus a turning tendency just like in wing warping and tilting. This will really take place automatically when the rudder is turned. The vertical and horizontal propellers, besides their regular function, can simultaneously act as horizontal and vertical rudder.

The V and inverted Λ formation of the wings makes for equilibrium in winds because one instant the wind strikes underneath one wing and over the back of the other and the next instant vice versa.

Figures 6, 7, 8, 9, 10:
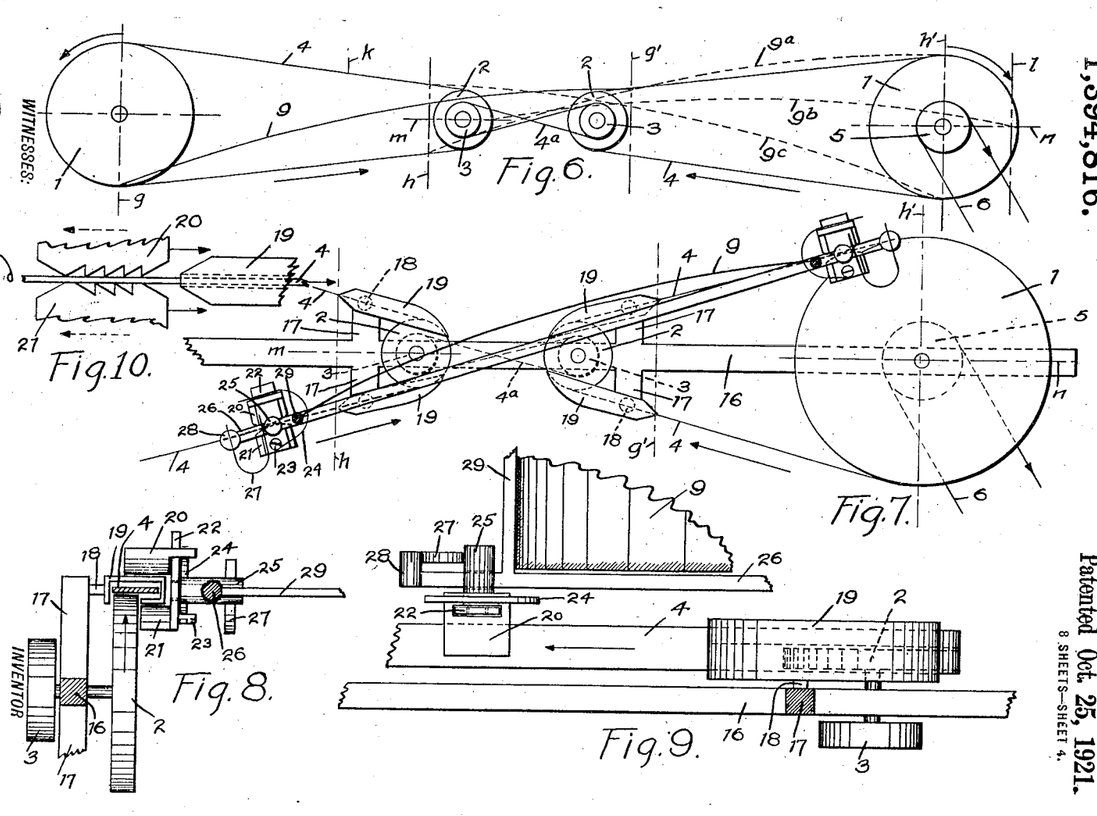
Figs. 6, 7, 8, 9 and 10 explain by diagram and mechanism how the posterior ends of the wings are made to hesitate in their travel in certain types of these machines.

Now taking up Fig. 6. The posterior end of the wing 9 travels from line $g$ to $h$, while the anterior end travels from $g'$ to $h'$, the two ends traveling at the same velocity. When the position of the wing 9, shown by dotted line $9^a$ is reached the posterior end must hesitate with respect to the anterior end, because as can be seen, the distance traveled by the anterior end around the circumference of wheel 1 from one side of the line $h'$ to its opposite or lower end is greater than that traveled by the posterior end around the circumference of the wheel 2 from line $h$ to its opposite or upper end as shown by the dotted line $9^c$ representing the wing 9 in that position. While the anterior end is traveling from one side of line $h'$ to the opposite, the posterior end (then becoming anterior) would want to travel from $h$ approximately to the point $k$. While the anterior end travels from the upper end of line $h'$ to an upper point on line $l$, the posterior end would advance from $h$ to the inner or right hand end of line $m$ as shown by dotted line $9^b$. Thus any further travel of the wing would tend to pull it in opposite directions, one end up toward $k$ the other toward the outer or right hand end of line $n$. This being the case the posterior end must pause or hesitate and to do this it should be lifted off the traveler 4 for an instant. The width of the wings as can be seen is such as to reach from the right hand end of line $n$ to the right hand end of line $m$ in Fig. 6, and this is true in all these types of machines.

Figs. 7, 8, 9 and 10 illustrate one example of a mechanism to cause this momentary pause. Supports 17 are provided to hold by means of the lugs 18 the slides 19 through which slides the traveler 4 has freedom to pass. The slide is not continuous (but may be) from the lower ends to the upper ends of both lines $h$ and $g'$ because at the inner end of a line drawn as $m$ the clutch on the ends of the rods supporting the wings which grips the traveler 4 should grip the traveler at this point so as to carry it over any dead center that may occur at this point. However, the air pressure under the wing will itself tend to kill any such dead center tendency. The posterior clutch leaves the traveler 4 at the lower end of line $h$, slides over the lower slide 19, grips the traveler again at the inner or right hand end of line $m$, releases the traveler again. When the dead center is passed, by passing on to the upper slide 19 and again grips the traveler when the upper end of line $h$ is reached, during this time the anterior clutch is traveling around the circumference of wheel 1 from upper end of line $h'$ to the lower end of this line.

To explain the clutch in detail I call attention to Figs. 8, 9 and 10. An upper and a lower jaw 20 and 21 respectively work to and fro on the slide bar 22 which is fastened onto the lower jaw 21 by screw 23. A spring 24 forces these jaws toward each other. Carried by the slide 22 is a lug 25 which can turn around on its long axis. This lug in turn carries a rod 26, slidable through the lug in a parallel direction to the long axis of the rod. This rod reaches in the direction from the anterior to the posterior ends of the wings, in other words, across the width of the wings. The spring 27 is provided to supply a little give, so that no strain is brought upon the wing in a direction from posterior to anterior. This spring is fastened to a lug 28 on the end of the rod 26 and with one end bearing loosely on the lug 25. A rod 29 is provided along the length of both the anterior and posterior margins of the wings. Calling attention to Fig. 10, the upper and lower jaws of the clutch are provided with serrations or teeth to better grip the traveler 4. This clutch may travel either way. When the wing is active and the air passive, power drives the traveler 4 as shown, the clutch is carried as indicated by the full line arrows. When the wing is passive and the air active as when the machine is descending with the power shut off, the clutch grips the belt or chain traveler and both go in the reverse direction as shown by the dotted arrows. In both directions the teeth have the right angle for grip. I have only given this form of clutch as an example, there are numerous other ways in the mechanic art to reach the same goal.

Figure 12:
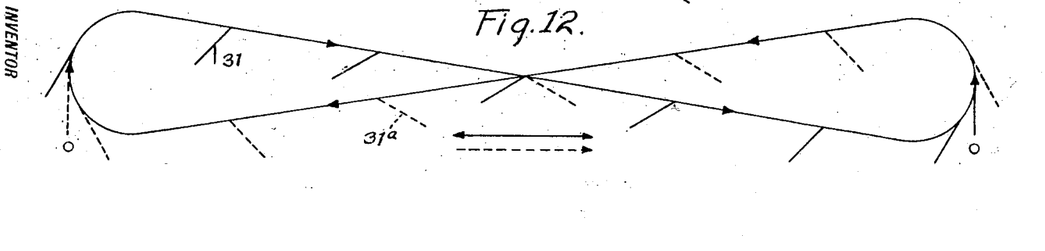

Taking up Figs. 11, 12, 13 and 14, here we have wing action similar to that of an insect, a wasp for instance, with its body fixed artificially. It will be noted that the direction of rotation of each traveler is the reverse of those in Fig. 1. The two travelers 4 in Fig. 11 carry a rod 30 fastened to the travelers at its ends by clutches, and in the center of this rod is pivotally attached one end of the anterior margin of the wing 31, while the posterior margin of the wing is free in space. The rod 30 has a length that reaches from the farthest right hand point on the circumference of the small wheel of one coupled pair of wheels to the right hand point (farthest) on the circumference of the large wheel of the other coupled set of wheels, in short, it is equal to the width of wing of Fig. 1 as described under Fig. 6. The central point 32 or support for the anterior margin of the wing 31 describes a figure of 8 track in space. It is understood that there are two such complete systems of wheels supporting each one end of the anterior margin of the wing. The figure of 8 is described in space between the vertical broken lines and of a form as depicted in Fig. 12. The dotted lines 30ª and 31ª represent the reverse down stroke, 30 and 31 showing the opposite down stroke. The up stroke takes place along the dotted line marked zero and is of short duration.

The double headed full line arrow indicates the reversing of the posterior end of the wing when it travels to and fro at right angles to the motion of the whole machine as in Fig. 13, while the dotted arrow indicates the non-reversal of the posterior end of the wing when the direction of flight is the same as that of the motion of the wing, that is, in the latter case the wing on the down stroke toward the right has its positions as shown by the full lines and on returning to the left the wing keeps this position, because when the forward speed of the machine is great enough, the air pressure on the wing keeps it in a fixed obliquity similar to that in the above mentioned down stroke. Fig. 13 can be provided with horizontal and vertical propellers as in Fig. 1.

As will be seen from the figures the wing during its vibration sweeps through a comparatively very large space. This space as already explained is practically a solid basis of support for the wing and for the flying machine. The wing attacks the air in such a manner as virtually to have no slip—this for two reasons—the wing reverses instantly; and acts as a kite during nearly the entire forward and backward strokes. The angles, moreover, made by the wing with the horizon during the back and forward strokes are at no two intervals the same but (and this is a remarkable circumstance) they are always adapted to the speed at which the wing is traveling for the time being. The increase and decrease in the angles made by the wing as it hastens to and fro are due partly to the resistance offered by the air and partly to the mechanism and mode of application of the wing to the air. It will be shown later (Figs. 35 and 34) that when one end of the posterior margin of the wing is capable of rotation around the long axis of the wing, the wing will have no dead points at the end of the down strokes because no two parts of the wing will reverse at exactly the same time, which causes the wing to screw its way through the air and releases the strain of a sudden reversal of the whole wing in every part.

Figures 14, 15, 16:
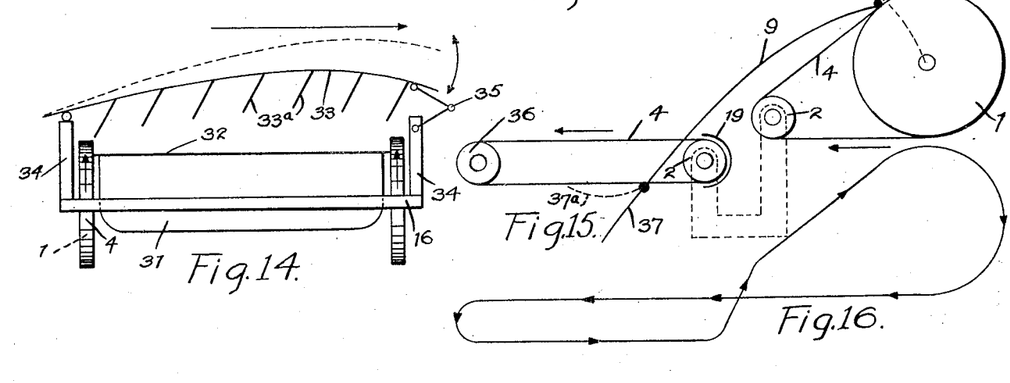
Figs. 15 and 16 show by diagram and mechanism still another form of machine.

As has been mentioned previously the family of beetles have both passive and active surfaces, that is, planes. In Figs. 13 and 14 I show how I can carry this out in effect in my machines. The passive plane is indicated by the dotted line 33, the active planes by 31. The passive plane is supported over and above the entire machine by the uprights 34. The angle of inclination can be varied in flight (as in beetles) by the links 35. The long straight arrow points in the direction of flight of the machine as a whole. The plane 33 can be built up in shutter fashion so that when rising vertically the shutters open and no obstruction is caused.

Fig. 15 illustrates a form of machine in which the direction of motion of the wings and machine coincide, that is, parallel each other as indicated by the long arrow. Fig. 15 is similar in operation to Fig. 1, but with this difference that there is only one forward and upward stroke and that always in the direction of flight indicated by the long full line arrow. The wheel 36 replaces one of the large wheels 1, heretofore used the various forms described. Only one slide 19 is required also. The center of the wheel 1 may be caused to swing using the small wheel of its system (companion wheel), as a center as shown by the curved dotted arrow; in this way any angle of stroke may be obtained. The posterior end 37 bends backward on the down stroke as shown by the dotted line 37ª thus being a horizontal propeller in fact. A kite like surface is always presented to the air during the up and down strokes. The body of the machine is represented by the dotted lines suspended from the axles of two inner small wheels 2. In the machine of Fig. 15 the weight of the body performs an important part by acting upon the inclined planes formed by the wings in the plane of progression. Fig. 16 gives the figure of 8 curve described in space by the margins (posterior and anterior) of this form of wing.

A tail is absolutely necessary in Fig. 15 types for balance, but not so in Fig. 1 types, because here the machine can go vertically up as high as desired and then go horizontally and vice versa, the vertical propellers doing the balancing. The rear flexible edge of the wing in Fig. 15 can be held down more or less on one side while the opposite side is allowed to bend as far as possible and vice versa, thus obtaining lateral stability. A stationary fin plane on the wing with its plane on a line parallel with the direction of flight will help steady just as was explained under Fig. 1 relative to auxiliary plane 14.

Figures 17, 18:
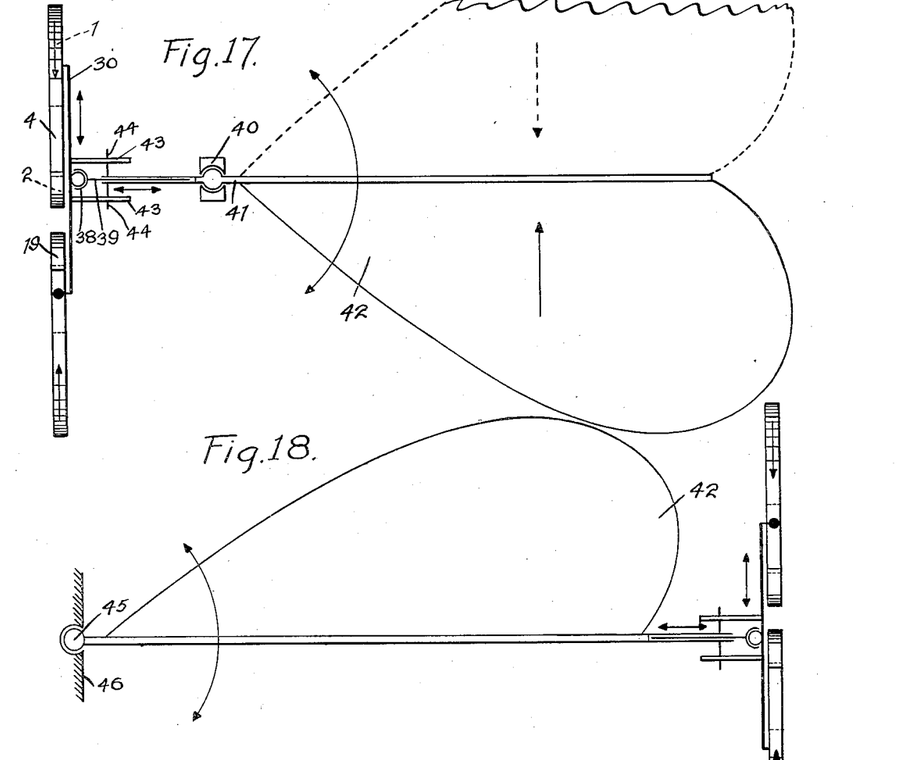
Figs. 17 and 18 show a third type.

Figs. 17 and 18 are of a type which imitate the wings of birds, bats and insects more closely than do any of the previous forms. Here the wing as a whole travels to and fro over a semi-circle, while the tip describes a figure of 8 for every complete to and fro cycle. A system of rotating mechanism and travelers as in Fig. 11 are provided. At the central point of the rod 30 is placed a universal joint 38, to which is attached a rod 39. A second universal joint 40 is provided which forms the fulcrum for the wing. A rod 41 pivoted on the joint 40 as a lever of the second order supports the wing 42 on one side of the fulcrum and terminates in a short hollow extension on the other side. The rod 39 and this hollow extension work together with a compound motion, that is, in and out along their length, and rotatably around their long axis. The springs 43 are attached to the rod 30 and bear upon the projections 44 which are rigidly attached to the hollow extension of the rod 41 which springs give the wing a limited twisting action either way, the normal position of the wing being with its plane at right angles to the plane of the paper. The joint 38 describes a figure of 8 communicating therefore a figure of 8 movement to the tip of the wing through the rod 41. The full line shows how the wing is twisted from the normal, when going in the direction of the full line straight arrow, the dotted wing and dotted arrow indicate the reverse stroke. The wing travels in a semi-circular path as shown by the double headed curved arrow. The two small double headed straight arrows indicate the compound motion given at the juncture of 41 and 39. The fulcrum 40 and figure of 8 mechanism may exchange places; then a lever of the third order is evolved which is a full imitation of bird, bat and insect wing motion and that to the application of power; that is, by a lever of the third order. Fig. 18 is similar to Fig. 17 with this difference, the figure of 8 mechanism works on the tip of the wing while the root of the wing works in a universal joint 45 held by the body of the machine 46.

Fig. 19 represents a form of machine employing cross heads 47 at the posterior ends of the wings 9. The action is the same as that of Fig. 1. Various positions of the wing 9 are illustrated, they are such as to cause the up and down strokes to glide into each other.

The full and dotted line arrows give the direction of motion of the wings. The cross heads and therefore the wing ends can hesitate when required without a special device such as a slide and clutch being required as in Fig. 1 types. As illustrated, the axes of all the wheels are on a straight line, the axes of the small wheels can be shifted to either side of this line as indicated by the double headed dotted lines. Any distorted form of figure of 8 can be described in space by such shifting of wheels, and this is possible in all forms of machines. When the small wheels are lowered so that the travelers on the bottom side lie on a straight line, then the up stroke as well as the down has a lifting tendency, whereas when all wheel centers lie on a straight line the up stroke only sustains to where the down lifts.

In Fig. 15 the posterior end of the wing can operate on a cross head instead of the parallel travelers, then it becomes half of such a system as Fig. 19.

Figures 23, 24, 25:
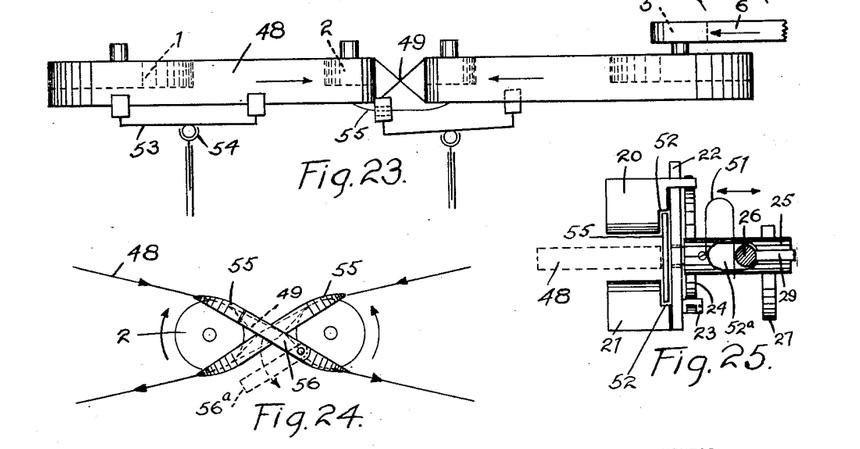

Figs. 20 and 21 represent a type of machine similar to Fig. 1 but with this difference that Fig. 20 requires only one traveler 48 crossed at 49 to cause the wing 9 to describe a figure of 8 track in space, whereas Fig. 1 requires two travelers 4. Hesitation of the posterior end is necessary also and is accomplished by means of slides 50 and such a clutch as described for Fig. 1 and shown in Figs. 7, 8, 9, 10. However in this form the clutch is provided with a "give" as indicated by the double headed arrows Fig. 21 so that the wing is not strained either in its length or breadth. Fig. 25 makes this more clear when compared with Fig. 8. The difference lies in the spring 51 and the slots 52 and $52^a$ in the jaws 20 and 21 and lug 25 respectively which are used respectively to accommodate the slides 55 and rod 26 used in Figs. 22 and 23.

The posterior end of the wing 9 is just mounting the slide 50. When it has advanced to position $9^d$ it has passed over half the slide—at position $9^e$ it is just about to leave the slide and now advances as the reversed up stroke. The reversed up stroke is $9^f$ and is shown well advanced.

The air pressure under the wings in Figs. 20 and 21 aids the wings in passing over the hesitating guides.

Figure 22:
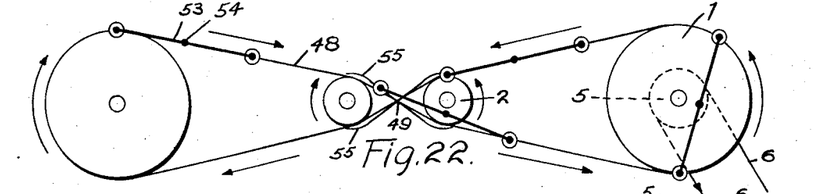

Looking at Figs. 22 and 23 we find a traveler 48 just as in Figs. 20 and 21 but the direction of rotation is reversed. Here a short rod 53 is supported by two clutches such as shown in Figs. 25. This rod is attached to the clutches in a manner similar to rod 26, Fig. 8. At the central point of this rod is supported a universal joint 54 or a rod 32 like that shown in Fig. 13; in the latter case two such wheel systems are required as in Fig. 13. Therefore Fig. 22 may operate with such forms of wings as illustrated by Figs. 11, 12, 13, 14, 17, 18. A different form of hesitating slide is here required and is depicted in Fig. 24. It is characterized as 55 in this Fig. 24 and Figs. 22 and 23. The two clutches with the rod 53 pass around the entire circuit covered by the traveler 48 and where the traveler is crossed at 49 the clutches and rod bridge over by means of the slide 55. One slide must be solid while the other is provided with a gate 56 which is opened by the clutches and rod striking it as shown by the dotted line 56$^a$ and closes automatically by a spring or the like. The gate opens the reverse way when the apparatus runs backward as in descending without power.

Fig. 25 illustrates how the clutch and slide engage each other. Two positions of the clutch and rod are shown in Fig. 23. The rod 29 is not necessary when the clutch is used with the form of Fig. 23 machine.

Figure 26:
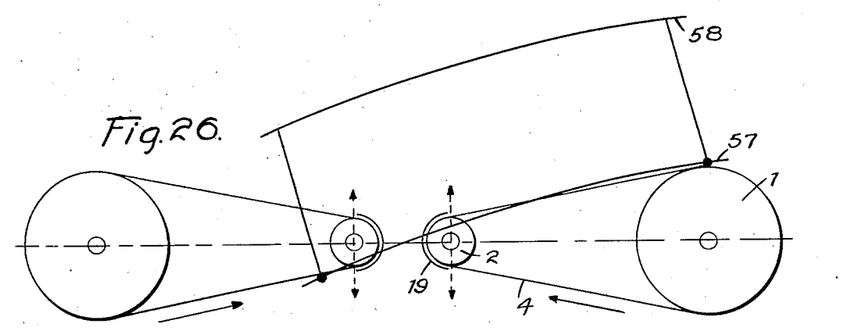
Fig. 26 shows double deck wings.

Fig. 26 illustrates a double deck arrangement. Here the lower plane 57 can act as the wing 9, Fig. 1 while plane 58 may be employed as a mere sustaining surface similar to 33, Figs. 13, 14. The wings may be placed in staggered relationship.

Figure 27:
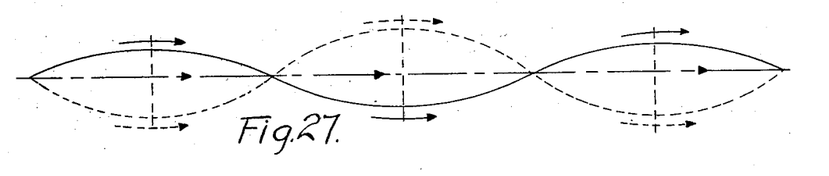
Figs. 27, 28 and 29 are diagrams explaining flight when the body of the machine is fixed and when progressing forward.

Fig. 27 shows how in progressive flight the wings and body of the machine describe wave tracks, which has been referred to heretofore and which is true in such types as described under Figs. 16 and 15. In this case the wing by virtue of being carried forward by the body in motion describes an undulatory or spiral course as shown in this Fig. 27.

The crests of the waves made by the wing, shown by the dotted lines are placed opposite the crests of the waves, shown in full lines, made by the body. The straight broken line indicates the direction of flight.

Figures 28, 29:
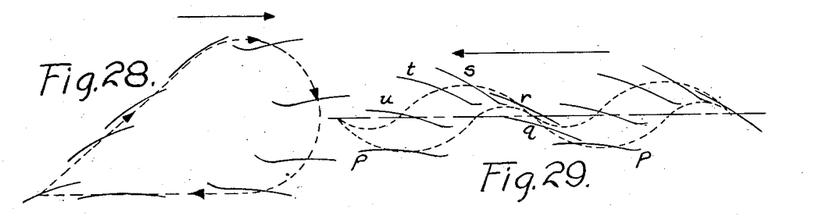

The way in which the natural wing rises and falls on the air and reciprocates with the body of the flying creature has a very obvious bearing on artificial flight. In natural flight the body of the flying creature falls slightly forward in a curve when the wing ascends and is slightly elevated in a curve when the wing descends. The wing and body are consequently always playing at cross purposes. The wing rising when the body is falling and vice versa. There are good reasons why the wings should always be in advance of the body. A bird when flying is a body in motion, but a body in motion tends to fall not vertically downward but downward and forward. The wings consequently must be in advance of the body of the bird, if they are to prevent the bird from falling downward and forward; if they were not the bird would turn a forward somersault. The forward and downward thrust of the wings is a general principle of flight—especially considering climbing a grade or starting to fly. The advantages gained are a separation of center of gravity and of air pressure, the former rearward, the latter forward, resulting in a climbing tendency. What is true as above stated of birds is likewise true when applied to Fig. 15. Fig. 28 illustrates the various angles made by the wings of Fig. 15 when the body of the machine is held fixed.

Fig. 29 illustrates the angles and waves made by the wing of Fig. 15 when the machine is in progressive flight in the direction of the arrow and the figure of 8 tracks are shown opened out into wave tracks. This figure also shows the kite like action of the wing on both the downward and up strokes; how the angles made by the wings with the horizon vary at every stage of these strokes; and how the wing evades the superimposed air during the up stroke and seizes the nether air during the down stroke; and shows how the down and up strokes run into each other; and the convex surface always directed upward and the concave surface downward. The up stroke is represented by the letters $p, q, r, s$; the down stroke by $s, t, u, p$. The down stroke is represented further by the broad space between the curves, the up stroke being upon the narrow portions of the curves.

In the machine of Fig. 15 and other types as well the weight of the body performs an important part by acting upon the inclined planes formed by the wings in the plane of progression. The power and weight may thus be said to reciprocate, the two sitting as is were side by side and blending their peculiar influences to produce a common result. When the wings descend they elevate the body, the wings being active and the body passive; when the body descends it contributes to the elevation of the wings, the body being active and the wings passive. The reaction of the compressed air under the wings also helps the elevation or up stroke of the wings. In this way weight forms a factor in flight, the wings and the weight of the body reciprocating and mutually assisting and relieving each other.

Figs. 30 and 31 show how the wheel 1, Fig. 1, may be replaced by several wheels to get a longer and more gradual down stroke. In Fig. 30 wheels 59 and in Fig. 31 wheels 60—60$^a$ replace wheel 1.

Figs. 30 and 31 can have wheels placed in such positions as to give very abrupt or slow down strokes and intermediate degrees. The traveler may roll on small rollers set at close intervals on and supported by a figure 8 structure and then be driven by auxiliary wheel. Figs. 30 and 31 as now shown are such in reality, save for the number of small rollers.

Figure 32:
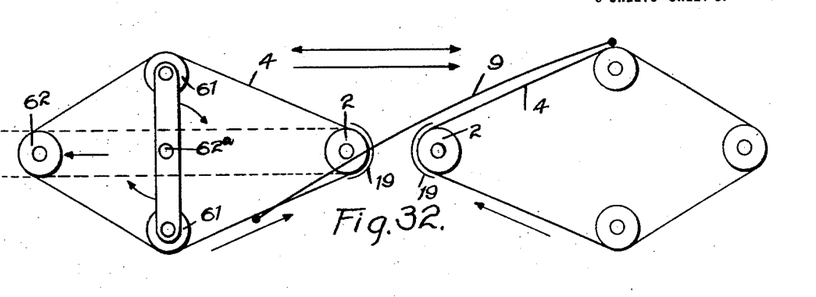

Fig. 32 shows how a change can be made from the form of Fig. 1 to that of Fig. 15 by simply swinging the coupled wheels 61 on the pivot 62$^a$ and moving the wheel 62 in the direction of the arrow adjacent to it and lifting away the slide 19 on the unchanged system of wheels. The double headed arrow indicates the wing action before changing, that is, two up and two down strokes alternately as in Fig. 1, the single headed arrow, the wing action after changing; one up and one down stroke as in Fig. 15 and flight in the direction of motion of the wing is indicated by this latter arrow, while in the former case flight is at right angles to the motion of the wings.

Figure 33:
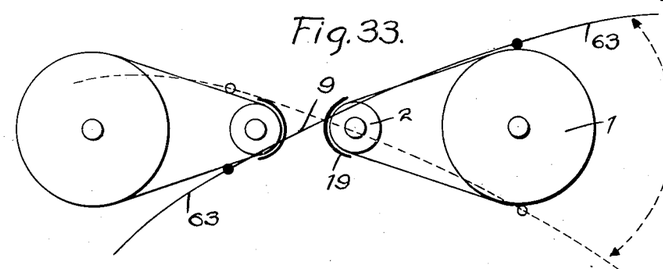
Fig. 33 shows how the length of the down stroke may be increased.

Fig. 33 shows how the length of the down stroke is increased by putting extensions 63 on the wing 9 and getting thereby a greater "bite" from the down stroke.

Figures 34, 35, 36:
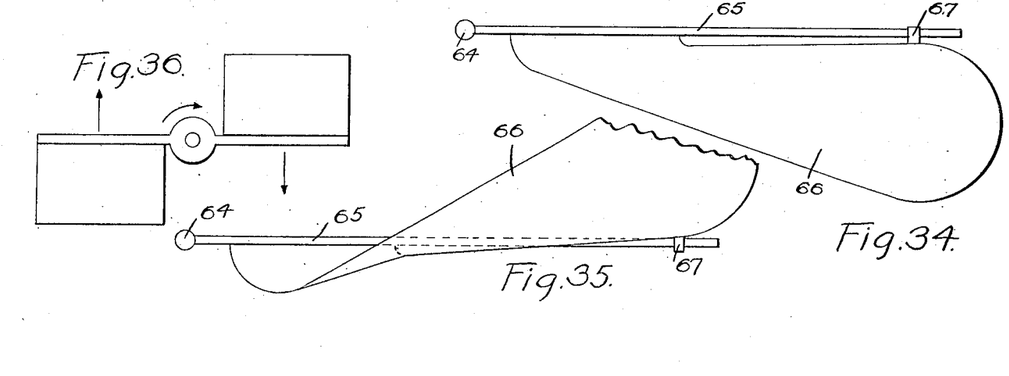
Figs. 34 and 35 are wings in which the tip and posterior margin can rotate around the long axis of the wing.
Fig. 36 explains how wings are apparently only equivalent to propellers, especially the vertical propelling wings I employ.

Fig. 34 is a wing in which the root end of the anterior margin of the wing is fixed while the tip end rotates around the long axis of the wing as shown by Fig. 35. A universal joint 64 forms the root of the wing, the rod 65 the anterior margin of the wing 66. A ring 67 attached to the tip of the wing rotates around the rod 65 when the wing is in motion. Since the wing goes to and fro, so does the twist of the wing change, that is, the tip rotation changes when the wing reverses. In this way no two parts of the wing reverse simultaneously, there are no dead points to the wing action because it attacks the air in screw fashion. With such a wing compound rotation goes on through the entire down and up strokes and this action is intimately associated with the power which the wing enjoys of alternately seizing and evading the air. Impact of the wings on the air takes away all shock from the whole mechanism.

Returning to the vertical propeller 11 in Figs. 1, 2, 3 and comparing it with the well known propeller such as Fig. 36 we see a similarity. The blades of both travel in opposite directions but in my form the blades reverse at each reversal of stroke, which lets them enjoy the advantage of utilizing the air currents of their own making, something not possible in the ordinary style propeller. The wings with the vertical propellers and air work in rhythm, whereby the wings and propellers create helpful air currents; consequently there is no such effect as disturbed air as that term is meant when applied to the ordinary propeller in which disturbed air causes a grave defect in its efficiency. The ordinary rotary propeller instead of creating helpful air currents sucks the air away from the place the blades most require air to get a good reaction. This is the cause of the inefficiency of the rotary propeller. Neither can the latter as usually constructed change its angle of obliquity to suit the speed change.

In all forms herein described the length of up and down strokes and form of figure of 8 curves can be changed by varying the sizes of the various wheels, length of traveler and distance between the companion sets of wheels; this latter also can regulate the width of the wings in the preferred forms.

The effective stroke in all cases is downward and forward, just as in nature the effective stroke is given. Since turning the vertical rudder causes the machine to turn, the propellers on one side propel more than those on the other thereby automatically aiding the rudder in turning the machine. My machine Fig. 1 in descending with the wings motionless acts just like an aeroplane with respect to the air striking the planes. The V and inverted Λ of the wings allows the air to strike the forward edge of the wings just as it does in the aeroplane. But there is this difference, (especially when the engine is cut off) in the aeroplane the center of gravity is liable to become disturbed and the machine will fall, while in my machine the V or inverted Λ ignores center of gravity with regard to overturning the machine. The machine can descend thus straight down or on an incline when the rudder is so set or the propellers set in motion by power independent of the horizontal wings. In such descending the wings must be large enough to allow soaring just as is the case in aeroplanes.

Since the aeroplane must go at a certain speed to prevent falling proves that the flapping wings must travel at a certain minimum speed to gain support upon the air on the up stroke, Fig. 1 type, and this speed must be the same as the minimum speed required by an aeroplane to support it. In both cases speed adds to the stability by gyroscopic action.

The flapping wings and propellers (vertical) pull the machine up and forward, and according to natural laws traction is more efficient than a pushing force.

The angles of the kite like surfaces of the wings should vary according to circumtances. They should be small when the speed is high and vice versa. This, it was stated, is true of natural wings; it should also be true of artificial. There is no escaping from natural laws.

It will be noted that the wings are so held by the travelers that on the down stroke the anterior and posterior ends are held firmly; on the up stroke, elastically.

Several pairs of wings can be provided in the same machine and each pair operating out of phase with its neighbors; a very steady elevating capacity is thus secured.

Flying is purely a deflective process in which the impulse is squeezed from the air by the cycloidally arcuate sweep of the descending wing reinforced by the weight and inertia of the body. Especially is this true in such cases as Fig. 15.

It is a general principle of mechanics that a moderate velocity of parts when it can produce the same useful result, as mechanism moving at much higher velocity, makes for safety, durability and economy, in either the animated or purely mechanical machine.

I do not wish to be understood as limiting myself strictly to the precise details of construction here-in-before described and shown in the accompanying drawings, as it is obvious that these details may be modified without departing from the spirit of my invention or sacrificing its advantages.

Having thus described my invention I claim:—

1. For aerial locomotion, a system of mechanism including rotational mechanism coupled by travelers said mechanism and travelers together in themselves having the form of a figure of 8 approximately, each of said travelers passing around two separate and spaced centers in each half of said figure of 8 each of said centers projecting a radius of different length, said mechanism and travelers carrying means for attacking the air, said means having one end attached to each traveler which forms the half figure of 8 and carried around by said traveler, said ends traversing said half figure of 8 in opposite directions so that the end toward which said means is moving is always on the upper part of its respective half figure of 8, said means thereby producing in space figure of 8 wave tracks, both open and closed.

2. For aerial locomotion, a system of mechanism including guides, said mechanism and guides together in themselves having the form of a figure of 8 approximately, each of said guides passing around two separate and spaced centers in each half of said figure of 8, each of said centers projecting a radius of different length, said mechanism and guides carrying means for attacking the air, said means having one end attached to each guide which forms the half figure of 8 and carried around by said guide, said ends traversing said half figures of 8 in opposite directions, so that the end toward which said means is moving is always on the upper part of its respective half figure of 8, said means thereby producing in space figure of 8 wave tracks, both open and closed.

3. For aerial locomotion, a system of mechanism including rotational mechanism coupled by travelers, said mechanism and travelers together in themselves having the form of a figure of 8 approximately, each of said travelers passing around two separate and spaced centers in each half of said figure of 8, each of said centers projecting a radius of different length, said mechanism and travelers carrying means for attacking the air, said means having one end attached to each traveler which forms the half figure of 8 and carried around by said traveler, said ends traversing said half figure of 8 in opposite directions so that the end toward which the said means is moving is always on the upper part of its respective half figure of 8, said means comprising wings for elevating and sustaining in a more or less vertical direction and position; and horizontal and vertical propellers for propelling in a more or less horizontal direction.

4. For aerial locomotion a system of mechanism including rotational mechanism coupled by travelers, said mechanism and travelers, together in themselves having the form of a figure of 8 approximately, each of said travelers passing around a plurality of centers in each half of said figure of 8, said mechanism and travelers carrying means for attacking the air, said means having one end attached to each traveler which forms the half figure of 8 and carried around by said traveler, said ends traversing said half figures of 8 in opposite directions so that the end toward which the said means is moving is always on the upper part of its respective half figure of 8, said means thereby producing in space figure of 8 wave tracks both open and closed.

5. For aerial locomotion, a system of mechanism including rotational mechanism coupled by travelers, said mechanism and travelers together in themselves having the form of a figure of 8 approximately, each of said travelers passing around two separate and spaced centers in each half of said figure of 8, each of said centers projecting a radius of different length, said mechanism and travelers carrying means for attacking the air, said means having one end attached to each traveler which forms the half figure of 8 and carried around by said traveler, the other end of said means operating in cross head fashion so that the end toward which the said means is moving is always on the upper part of its respective half figure of 8 when the effective stroke is given, whereby said means produces a lifting force.

6. For aerial locomotion a system of rotational mechanism coupled by travelers, said mechanism and travelers carrying means for attacking the air, said means consisting of wings that sustain and elevate and which are so carried that one end of each wing acts as a pivot around which the other end oscillates, and said means consisting further of wings that propel, through the action of the aforesaid wings.

7. For aerial locomotion, a system of mechanism partaking of the form of a figure of 8, said mechanism carrying means for attacking the air, said means consisting of horizontal and vertical wings, said wings elevating, sustaining, propelling and stabilizing.

8. In a flying machine, a sustaining unit comprising a wing, a longitudinally extending member at each side of the wing and means for moving the wing to and fro transversely to the line of flight of the machine comprising continuous travelers, each traveler forming one loop of an elongated figure 8, and carrying with it one end of one of said longitudinally extending members, said members traversing said loops in opposite directions so that the side toward which the wing is moving is always on the upper part of its respective loop.

9. In a flying machine, a sustaining unit comprising a wing, a wing support and means for moving the wing to and fro comprising continuous travelers, each traveler forming one loop of an elongated figure 8 and carrying with it one end of one of said wing supports, said supports traversing said loops in opposite directions.

10. For use in propelling in air or other media, a mechanical movement consisting of a system of mechanism including rotational mechanism coupled by travelers, said mechanism and travelers together in themselves having the form of a figure of 8 approximately each of said travelers passing around two separate and spaced centers in each half of said figure of 8, each of said centers projecting a radius of different length, said mechanism and travelers carrying means for describing figure of 8 tracks.

11. In a flying machine, a sustaining unit comprising a wing, a longitudinally extending member at each side of the wing and means for moving the wing to and fro transversely to the line of flight of the machine comprising continuous travelers, each traveler forming one loop of an elongated figure 8 and carrying with it one end of one of said longitudinally extending members, said members traversing said loops in opposite directions so that the side toward which the wing is moving is always on the upper part of its respective loop; means comprising a passive wing or plane, means for stabilizing and steering and means for supporting and operating the above devices.

In testimony whereof I have signed my name to this specification this 7th day of October, 1915.

RICHARD A. ENGLER.